United States Patent [19]

Ito et al.

[11] Patent Number: 4,526,765
[45] Date of Patent: Jul. 2, 1985

[54] METHODS FOR PREPARING AMORPHOUS ZIRCONIUM PHOSPHOSILICATE

[75] Inventors: Kathuhiko Ito, Kobe; Hiroshi Sugii, Osaka; Yukito Takata, Toyonaka; Kyoichiro Kokubu, Suita, all of Japan

[73] Assignee: Daiichi Kigenso Kagaku Kogyo Co., Ltd., Osaka, Japan

[21] Appl. No.: 520,315

[22] Filed: Aug. 4, 1983

[30] Foreign Application Priority Data

Aug. 4, 1982 [JP] Japan ................................. 57-136572

[51] Int. Cl.$^3$ ...................... C01B 25/00; C01B 25/12; C01B 33/20; C01G 25/02
[52] U.S. Cl. ...................................... 423/306; 423/69; 423/305
[58] Field of Search ........................ 423/305, 306, 69

[56] References Cited

FOREIGN PATENT DOCUMENTS 0067274 12/1982 European Pat. Off. ............ 423/306
2052462 1/1981 United Kingdom ................ 423/306

OTHER PUBLICATIONS

V. L. Struzhko et al., Ukr. Khim. Zh., pp. 1217–1220, T. 47, No. 11, (1981).
D. Naumann, Z. Chem., No. 1, pp. 247–250, (1961).

Primary Examiner—G. L. Kaplan
Attorney, Agent, or Firm—Armstrong, Nikaido, Marmelstein & Kubovick

[57] ABSTRACT

The present invention provides novel amorphous phosphosilicates represented by the formulae $Zr(PO_4)_{2y}(SiO_2)_z \cdot nH_2O$ (I) and $M_{2/l}Zr(PO_4)_{2y}(SiO_2) \cdot nH_2O$ (III) and the processes for producing the same.

59 Claims, 4 Drawing Figures

METHODS FOR PREPARING AMORPHOUS ZIRCONIUM PHOSPHOSILICATE

The present invention relates to novel amorphous zirconium phosphosilicate and a process for preparing the same.

Zirconium silicate is known as a ceramic material having high resistance to heat, chemicals, etc., while zirconium phosphate is known as an ion exchange material. Recently research has been conducted on the synthesis of zirconium phosphosilicate which is expected to have various properties of both materials. The synthesis process to which research efforts are presently directed is a so-called "dry process" wherein a powdery mixture, for example, of sodium carbonate, zirconium oxide, silicon oxide and ammonium phosphate is reacted at a high temperature of at least 900° C. to give a sintered product having a crystalline structure. However, the crystalline product of zirconium phosphosilicate obtained is still unsatisfactory in physical and chemical properties, such as heat resistance, chemical resistance and specific surface area, and is used merely as a thermal ion conductor and the like under greatly limited conditions.

Directing attention to the high reactivity of the zirconium atom contained in water-soluble zirconium compounds, we have carried out extensive research to produce novel amorphous zirconium phosphosilicate and found that the process to be described below and practiced under specific conditions gives zirconium phosphosilicates having the heat resistance and chemical resistance of zircon ($ZrO_2 \cdot SiO_2$) and also the high ion exchange ability of zirconium phosphate. Thus the present invention has been accomplished.

More specifically the present invention provides an amorphous zirconium phosphosilicate (i) represented by the formula $Zr(PO_4)_{2y}(SiO_2)_z \cdot n'H_2O$ (I) wherein y is 0.02 to 2.00, z is 0.05 to 16.00 and n' is 0 to 10.00, (ii) represented by the formula $ZrO_2 \cdot yP_2O_5 \cdot zSiO_2 \cdot nH_2O$ (II) wherein y and z are as defined above and n is the same as n', when analytically calculated as a double oxide, and (iii) having the physical and chemical properties of (a) a specific surface area of about 20 to about 700 m$^2$/g as determined by the BET method, (b) a true specific gravity of about 2 to about 3.5 g/cc, (c) a pH of about 1.5 to about 7 when in the form of 3% aqueous dispersion, and (d) ability to adsorb 5 to 80% of water at a temperature of 25° C. and a relative humidity of 65% based on the weight of the zirconium phosphosilicate.

The invention also provides an amorphous zirconium phosphosilicate (i) represented by the formula $M_{2/l}Zr(PO_4)_{2y}(SiO_2)_z \cdot n'H_2O$ (III) wherein M is a cation, l is the valence of the cation, y is 0.02 to 2.00, z is 0.05 to 16.00 and n' is 0 to 9.00, (ii) represented by the formula $mM_{2/l}O \cdot ZrO_2 \cdot yP_2O_5 \cdot zSiO_2 \cdot nH_2O$ (IV) wherein $0 < m \leq 2.00$, $M_{2/l}O$ represents the same cation as above in terms of an oxide, l, y and z are as defined above and n is the same as n', when analytically calculated as a double oxide, and (iii) having the physical and chemical properties of (a) a specific surface area of about 20 to about 700 m$^2$/g as determined by the BET method, (b) a true specific gravity of about 2 to about 3.7 g/cc, (c) a pH of about 2 to about 11 when in the form of 3% aqueous dispersion, and (d) ability to adsorb 5 to 80% of water at a temperature of 25° C. and a relative humidity of 65% based on the weight of the zirconium phosphosilicate.

Figure 1:
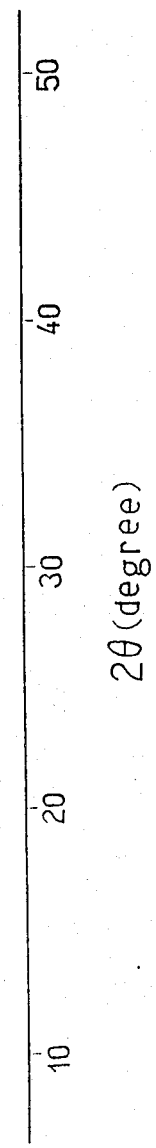
FIG. 1 is an X-ray diffraction pattern for a zirconium phosphosilicate of the invention.

The amorphous zirconium phosphosilicate represented by the formula (I) is produced in the following manner. First, respective aqueous solutions of a water-soluble zirconium compound, water-soluble phosphorus compound and water-soluble silicon compound are prepared so that the $P_2O_5/ZrO_2$ mole ratio is 0.02 to 2.50, with the $SiO_2/ZrO_2$ mole ratio in the range of 0.05 to 20.00, and the solutions are mixed together at the same time or in succession and then reacted. The concentrations of the aqueous solutions are so adjusted that the amount of the end product in the reaction mixture will not exceed 20 wt. %. Examples of useful water-soluble zirconium compounds are zirconium oxychloride, zirconium hydroxychloride, zirconyl sulfate, zirconyl nitrate and like mineral acid compounds, zirconyl acetate, zirconyl formate and like organic acid compounds, and ammonium zirconyl carbonate, potassium zirconyl carbonate, sodium zirconyl carbonate, ammonium zirconyl acetate, ammonium zirconyl lactate and like complex salts, among which zirconium oxychloride, zirconium hydroxychloride, zirconyl sulfate, zirconyl nitrate, etc. are preferable. Examples of useful water-soluble phosphorus compounds are phosphoric acid, pyrophosphoric acid, condensation phosphoric acid, and alkali metal salts and ammonium salts of these phosphoric acids, such as sodium phosphate, potassium phosphate, sodium tripolyphosphate, sodium hexametaphosphate, potassium pyrophosphate, sodium pyrophosphate, ammonium phosphate, ammonium tripolyphosphate, sodium hexametaphosphate and sodium pyrophosphate, among which phosphoric acid and sodium phosphate are more suitable. Examples of useful water-soluble silicon compounds are silicic acid, sodium silicate, sodium orthosilicate, sodium sesquisilicate, sodium metasilicate and like alkali silicates, water glass silicate, colloidal silica, etc. From the viewpoint of cost and processability, sodium silicate, sodium metasilicate and water glass silicate are advantageous to use. When the $P_2O_5/ZrO_2$ mole ratio is above 2.50 and/or when the $SiO_2/ZrO_2$ mole ratio is below 0.05, there is an increased tendency for unreacted phosphoric acid to remain, for $SiO_2$ to encounter difficulty in reaction and for the resulting product to have a reduced specific surface area and lower ability to adsorb water. When the $SiO_2/ZrO_2$ mole ratio is above 20.00, $SiO_2$ partly remains unreacted uselessly, while $SiO_2$ singly forms a gel, rendering the resulting product likely to have reduced resistance to chemicals, especially to alkali and impaired ion exchange ability. If the $P_2O_5/ZrO_2$ mole ratio is less than 0.02, the reaction almost fails to give the desired compound, giving a product which is exceedingly lower than the product of the invention in ion exchange ability, resistance to chemicals, especially to alkali, and heat resistance. With an increase in the $P_2O_5/ZrO_2$ mole ratio and/or a decrease in the $SiO_2/ZrO_2$ mole ratio within the foregoing mole ratio ranges, the end product generally has an increased true specific gravity, a reduced pH when in the form of 3% aqueous dispersion, improved resistance to acids and alkalis and enhanced ion exchange ability. However, if the $P_2O_5/ZrO_2$ mole ratio is above about 0.5 to about 0.9, the specific surface area and ability to adsorb water decrease. This indicates that the product has smaller pores, with a reduced range of pore size distribution. Further with an increase in the $SiO_2/ZrO_2$ mole ratio, the end product tends to have an increased specific surface area, a lower true specific gravity, a higher pH when in the form of 3% aqueous dispersion, an increased ability to adsorb water, an enhanced resistance to alkalis, an impaired ion exchange ability and lower strength when in the form of particles.

In preparing the aqueous solution of zirconium compound, there is a need to prevent precipitation of zirconyl hydroxide. For this purpose, it is preferable for the aqueous solution to have a pH of up to 4 when zirconium oxychloride, zirconyl sulfate, zirconyl nitrate or like mineral acid salt is used, or a pH of 2 to 7 in the case of zirconyl acetate, zirconyl formate or like organic acid salt, or a pH of 4 to 12 in the case of ammonium zirconyl carbonate, potassium zirconyl carbonate, sodium zirconyl carbonate, ammonium zirconyl acetate, ammonium zirconyl lactate or the like. When the aqueous solutions of water-soluble zirconium compound, water-soluble phosphorus compound and water-soluble silicon compound are mixed together at the same time, the mixture to be reacted is maintained at a pH of up to 4. Examples of preferred pH adjusting agents for this purpose are mineral acids such as hydrochloric acid, sulfuric acid and nitric acid.

When the aqueous solutions of zirconium compound, phosphorus compound and silicon compound are mixed in a successive order, it is desirable (a) to mix together the solution of zirconium component and the solution of silicon component to obtain an acidic solution and admix the solution of phosphorus component with the acidic solution, or (b) to mix together the solution of phosphorus component and the solution of silicon component and admix the solution of zirconium component with the resulting mixture. In the former case (a), it is favorable to maintain the mixture of zirconium component solution and silicon component solution at a pH of up to 4 to prevent the precipitation of the zirconium component. In this case, pH adjusting agents, such as the above-mentioned mineral acids, are useful. In the latter case (b), it is desirable that the solution mixture containing the phosphorus component and the silicon component have a pH of up to 10. In either of these cases (a) and (b), it is desirable that the solution mixture of zirconium, silicon and phosphorus components have a pH of up to 4.

It is desired to carry out the reaction with stirring to assure a uniform reaction for forming the amorphous zirconium phosphosilicate of the formula (I). Preferably the reaction temperature is usually about 5° to about 70° C. although not limited particularly. The slurry obtained by the reaction and containing the desired product is allowed to stand at about 5° to about 100° C. for about 1 to about 240 hours for aging, and the resulting precipitate is washed and then subjected to solid-liquid separation to obtain a wet cake. The aging can of course be completed within a shorter period of time if the temperature is higher. The cake is dried at a temperature of up to about 250° C., preferably about 40° to about 150° C., and, when desired, is further heated at about 250° to about 950° C., whereby the desired amorphous zirconium phosphosilicate of the formula (I) is prepared.

The amorphous zirconium phosphosilicate thus obtained has the following properties.

(i) It has a composition represented by the formula $Zr(PO_4)_{2y}(SiO_2)_z \cdot n'H_2O$ (I) wherein y is 0.02 to 2.00, z is 0.05 to 16.00 and n' is 0 to 10.00.

(ii) When analytically calculated as a double oxide, the compound can be expressed by the formula $ZrO_2 \cdot yP_2O_5 \cdot zSiO_2 \cdot nH_2O$ (II) wherein y and z are as defined above and n is the same as n'.

(iii) (a) The compound has a specific surface area of about 20 to about 700 m²/g as determined by the BET method resorting to nitrogen adsorption.

(b) The compound has a true specific gravity of about 2 to about 3.5 g/cc as measured by a specific gravity bottle.

(c) The compound has a pH of about 1.5 to about 7 when in the form of 3% aqueous solution.

(d) The compound has ability to adsorb 5 to 80% of water, based on the weight of the compound, at a temperature of 25° C. and a relative humidity of 65%.

(iv) (a) The compound has high resistance at any pH value.

(b) It is colorless and transparent, or white.

(c) It is in the form of particles.

The compound represented by the formula (III) is produced by any one of the following processes (1) to (4).

(1) A solution of zirconium component, a solution of phosphorus component and a solution of silicon component are mixed together at the same time or in succession, with one or at least two kinds of cations incorporated in at least one of the three solutions, and the mixture is reacted while effecting ion exchange during the reaction to obtain a slurry of cation-containing product. The slurry is thereafter subjected to the same steps as in the production of the compound of the formula (I) for aging, washing, solid-liquid separation, drying and, when required, heat treatment to obtain the desired amorphous zirconium phosphosilicate (III).

(2) A solution of zirconium component, a solution of phosphorus component, a solution of silicon component and a solution containing one or at least two kinds of cations are mixed together at the same time or in succession, and the mixture is reacted while effecting ion exchange at the same time. The same procedure as in the above (1) thereafter follows to obtain the compound (III).

(3) One or at least two kinds of cations are admixed with a slurry prepared as above and containing the compound (I) for ion exchange. The same procedure as in the above (1) thereafter follows to obtain the compound (III).

(4) One or at least two kinds of cations are admixed with a wet cake obtained by the solid-liquid separation of a slurry containing the compound (I) or with an aqueous dispersion prepared by drying the cake and dispersing the resulting powder in water to effect ion exchange. The same procedure as in the above (1) thereafter follows to obtain the compound (III).

Examples of useful cations are $NH_4^+$ and those formed from the following elements; Li, Na, K, Rb and Cs in Group 1A of the Periodic Table; Cu and Ag in Group 1B of the Periodic Table; Be, Mg, Ca, Sr and Ba in Group 2A of the Periodic Table; Zn, Cd and Hg in Group 2B of the Periodic Table; Sc, Y, lanthanide elements and actinide elements in Group 3A of the Periodic Table; Al, Ga, In and Tl in Group 3B of the Periodic Table; V, Nb and Ta in Group 5A of the Periodic Table: Cr, Mo and W in Group 6A of the Periodic Table; Mn in Group 7A of the Periodic Table; and Fe, Co, Ni, Ru, Pd, Ir and Pt in Group 8 of the Periodic Table. Examples of useful compounds for forming cations are chlorides, sulfates, nitrates and like mineral acid salts, formates, acetates and like organic acid salts, hydroxides, double salts of alkalis and sulfates, etc., which will not break down the zirconium phosphosilicate to be subjected to ion exchange.

In the ion exchange processes (3) and (4), a compound wherein hydrogen ions have been partly or wholly replaced by other cations can be further subjected to ion exchange to obtain an end product containing the desired kind of ions. For example, Na-type zirconium phosphosilicate containing sodium ions can be subjected to ion exchange with iron ions to obtain Fe-type zirconium phosphosilicate.

The ion exchange process can be practiced batchwise, with use of a column or in any other desired manner.

The cation exchange ratio is adjustable as desired by varying such conditions as the composition of zirconium phosphosilicate, heat treatment temperature therefor, kind of cation, concentration and amount of the solution of salt used for exchange, pH of exchange system, method and duration of contact, etc. For example; (a) the greater the $P_2O_5/ZrO_2$ mole ratio of zirconium phosphosilicate or the smaller the $SiO_2/ZrO_2$ mole ratio thereof, the higher is the cation content; (b) the higher the drying temperature in the range of 100° to 250° C., the lower is the cation content; (c) the higher the concentration of salt used for metal ion exchange or the higher the pH of the cation-containing solution, the higher is the cation content.

The amorphous zirconium phosphosilicate thus obtained by cation exchange has the following properties.

(i) It has a composition represented by the formula $M_{2/l}Zr(PO_4)_{2y}(SiO_2)_z \cdot n'H_2O$ (III) wherein M is a cation, l is the valence of the cation, y is 0.02 to 2.00, z is 0.05 to 16.00 and n' is 0 to 9.00.

(ii) When analytically calculated as a double oxide, the compound can be expressed by formula $mM_{2/l}O \cdot ZrO_2 \cdot yP_2O_5 \cdot zSiO_2 \cdot nH_2O$ (IV) wherein $0 < m \leq 2.00$, $M_{2/l}O$ represents the same cation as above in terms of an oxide, l, y and z are as defined above and n is the same as n'.

(iii) (a) The compound has a specific surface area of about 20 to about 700 m²/g as determined by the BET method resorting to nitrogen adsorption.

(b) The compound has a true specific gravity of about 2 to about 3.7 g/cc as measured by a specific gravity bottle.

(c) The compound has a pH of about 2 to about 11 when in the form of 3% aqueous solution.

(d) The compound has ability to adsorb 5 to 80% of water, based on the weight of the compound, at a temperature of 25° C. and a relative humidity of 65%.

(iv) (a) The color of the compound varies with the kind and amount of the cation contained therein, the water content of the compound, etc.

(b) It is in the form of particles.

The amorphous zirconium phosphosilicate (III) includes all of those wherein some or all of the hydrogen atoms of the amorphous zirconium phosphosilicate (I) are replaced by one or at least two kinds of cations. Accordingly the physical and chemical properties of the compound (III), such as specific surface area, ability to adsorb water, specific gravity, color and pore size thereof, pH of aqueous dispersion thereof, etc., as well as the application characteristics of the compound, such as ability to selectively adsorb substances, amount of adsorption, etc., are controllable by changing the kind of cation and the amount of replacement thereof. For example, the 3% aqueous dispersion of the compound (I) formed in a strongly acidic solution has a pH in the acid range, whereas the pH of similar dispersion of the compound (III) prepared by replacing the hydrogen of the compound (I) by an alkali metal ion changes from the acid range to neutrality and then to the alkali range with an increase in the amount of ion replacement. When the compound (III) is used as an adsorbent, therefore, the pH of the compound is adjustable in accordance with the pH range required for the adsorbate concerned.

The amorphous zirconium phosphosilicates (I) and (III) prepared according to the present invention, which have the foregoing unique physical and chemical properties, are very useful as adsorbents, drying agents, catalysts, ion exchange materials, fillers, electronic materials, carriers for active substances, etc.

The invention will be described in greater detail with reference to the following examples. However, the invention can be practiced by processes other than those exemplified below and therefore is not limited by the examples.

Various measurements involved in the following examples were conducted by the methods given below.

(1) $ZrO_2$: A sample dried at 105° C. was melted and decomposed with use of sodium carbonate, the product was subjected to extraction with water and the insolubles were melted and separated off with potassium pyrosulfate to convert Zr to mandelate, which was ashed by heating to obtain $ZrO_2$.

(2) $SiO_2$: The same decomposed product as prepared above with sodium carbonate was subjected to extraction with water, and the insolubles were converted with use of sulfuric acid to silica gel, which was treated with hydrofluoric acid.

(3) $P_2O_5$: The same decomposed product as prepared above was converted to obtain a molybdate, to which an excess of sodium hydroxide normal solution was added. The resulting solution was titrated with nitric acid normal solution for determination.

(4) $H_2O$: A sample dried at 105° C. was baked at 1000° C. The amount of $H_2O$ was determined from the reduction of weight.

(5) Ion-exchanged elementary component: Twenty grams of a sample dried at 105° C. was subjected to elution with use of a column and hydrochloric acid or nitric acid, and the metal dissolving out in the eluent was determined by the atomic absorption method according to JIS K-0121.

(6) X-ray diffractiometry: A powdery sample and an X-ray diffractometer ("Geigerflex RAD-11A.", product of Rigaku Denki Co., Ltd.) was used.

(7) Specific surface area: Measured with use of a specific surface area-pore size distribution analyzer ("Acusorb 2100-01", product of Micromeritics Ltd.) according to the BET method resorting to the adsorption and desorption of nitrogen.

(8) Specific gravity: A sample dried at 105° C. and a specific gravity bottle were used according to JIS Z-8807.

(9) Differential thermal analysis: A sample (20 mg) was analyzed in an air atmosphere by elevating temperature at a rate of 20° C./min, using a differential thermobalance ("Model TG-DTA" for high temperatures, product of Rigaku Denki Co., Ltd.)

(10) Color and shape: Observed with the unaided eye and also with a loupe.

(11) Particle size: Measured according to JIS K-0069.

(12) Packing density: Measured according to JIS Z-0701.

(13) Strength of particles: Measured according to JIS K-1464.

(14) pH: A sample (3 g) was added to 100 ml of distilled water and stirred for 10 minutes. The pH of the supernatant was measured.

(15) Ability to adsorb water: A sample (3 g) was dried at 105° C. for 3 hours and then held in a constant-temperature constant-humidity chamber for 48 hours at a temperature of 25° C. and a relative humidity between 50% and 60%. The value was calculated from the following equation:

$$\text{Ability to adsorb water (\%)} = \frac{\text{Weight of water absorbing sample} - \text{Weight of dry sample}}{\text{Weight of dry sample}} \times 100$$

EXAMPLE 1

Figure 2:
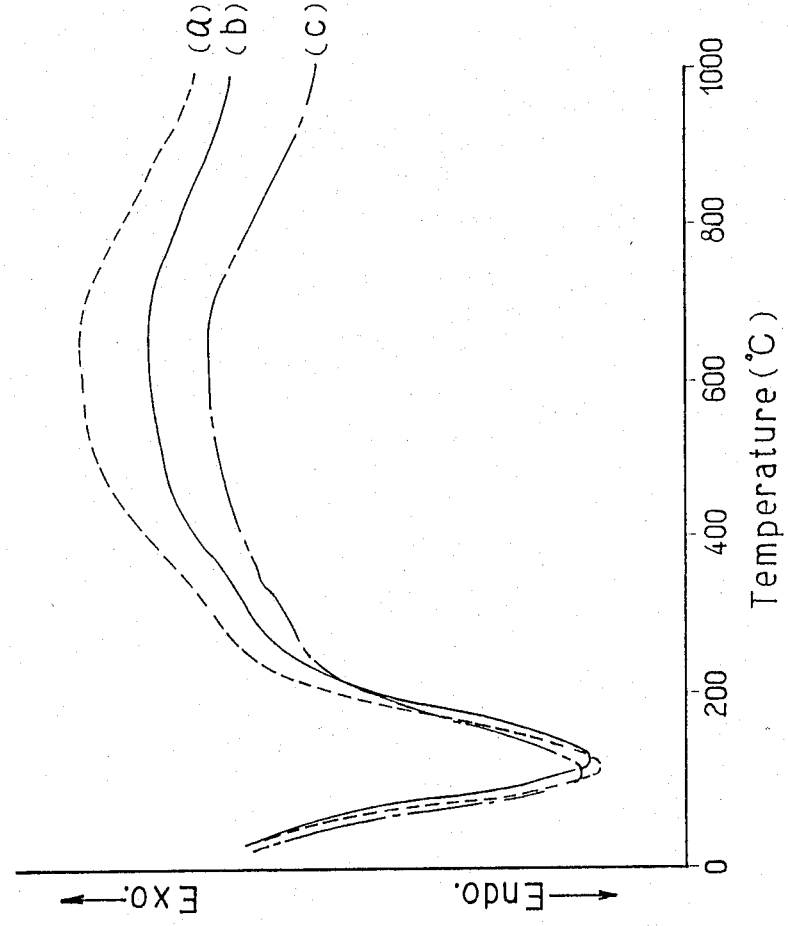
FIG. 2 is a graph of the differential thermal analysis of a zirconium phosphosilicate of the invention.

A 162.2 g quantity of sodium silicate solution (commercial product conforming to JIS K-1408, having a $SiO_2/Na_2O$ mole ratio of 1/3.17 and containing 28.54% $SiO_2$ and 9.30% $Na_2O$) was diluted with 1400 ml of water, and 500 ml of dilute phosphoric acid solution containing 52.9 g of 85.08% phosphoric acid was added to the dilution to obtain a transparent solution mixture. A solution of zirconium oxychloride was prepared by dissolving 106.2 g of $ZrOCl_2.8H_2O$ crystals (99.5%) and 45.4 ml of concentrated hydrochloric acid (JIS Reagent Bulletin) in 900 ml of water and stirring the mixture. For reaction, the solution of zirconium oxychloride was added to the solution mixture of sodium silicate and phosphoric acid over a period of 1 minute while stirring the solution mixture. The resulting slurry had a $P_2O_5/ZrO_2$ mole ratio of 0.70, a $SiO_2/ZrO_2$ mole ratio of 2.35 and a pH of up to 1.0. The slurry was heated at 80° C. for 1 hour, thereafter aged at room temperature for 1 day and then filtered by a filter press. The cake obtained was washed with 8000 ml of desalinated water and dewatered after confirming that no chlorine ions were detected in the washings with use of a silver nitrate solution, whereby 1986 g of wet cake was obtained. The cake was dried at 105° C. for 20 hours within a forced hot air dryer, giving 130 g of hard solids. When chemically analyzed, the product was found to contain 33.4% $ZrO_2$, 24.5% $P_2O_5$, 34.2% $SiO_2$ and 11.0% $H_2O$ and to have the composition of $ZrO_2.0.70P_2O_5.2.31SiO_2.2.47H_2O$ in terms of mole ratio of oxides. The dry product was analyzed by X-ray diffractiometry with the result shown in FIG. 1. It is seen that the product exhibits an X-ray diffraction pattern peculiar to amorphous compounds. In FIG. 2, Curve (a) shows the result obtained by subjecting the product to differential thermal analysis. The solid product further had the following properties.

| Color, shape: | |
|---|---|
| Colorless transparent hard particles | |
| Particle size: | |
| Larger than 7 mesh | 0.0% |
| 7 Mesh to 24 mesh | 98.1% |
| Smaller than 24 mesh | 0.9% |
| Specific surface area: | 418 m²/g |
| True specific gravity: | 2.5 g/cc |
| pH: | 3.6 |
| Particle strength (7 to 24 mesh): | 0.1% |
| Ability to adsorb water: | 24.4% |
| (25° C., R.H. 65%) | |

Figure 3:
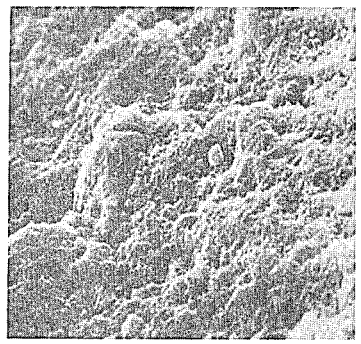
FIG. 3 is an electron photomicrograph (30000×) of the particles of zirconium phosphosilicate of the present invention.

FIG. 3 is an electron photomicrograph (30000×) showing the surface of particles obtained by pulverizing the dry product in a mortar. It is seen that the particles have a porous structure.

The dry product has a large pore volume. The pore radius distribution diagram of the product shows a distinct peak at about 10 Å, revealing almost no pore radii larger than 50 Å.

The zirconium phosphosilicate having such uniform and fine pores is especially useful as a solid acid catalyst, selective solid catalyst and like catalysts, and also as a selective adsorbent.

EXAMPLE 2

The Product of Example 1 having the composition of $ZrO_2.0.70P_2O_5.2.31SiO_2.2.47H_2O$ in terms of oxide mole ratio was made into an Na-type product by being subjected to ion exchange with use of a sodium salt in the following manner.

The dry product (120.0 g) obtained in Example 1 was placed into 500 ml of desalinated water, then pulverized, agitated several times during a period of 20 minutes and thereby dispersed in water to fully deaerate the product. The dispersion was then poured into a glass filter (glass tube 25 mm in inside diameter and 500 mm in length), 640 ml of a 2.97% NaCl solution serving as an ion exchange salt source was passed through the tube at a SV of 10, and thereafter 3500 ml of desalinated water was passed through the tube as a down flow at a SV of 30. After confirming that no chlorine ions were present in the washings, the contents were taken out from the column and dried at 105° C. to give 121 g of Na-substituted product. When chemically analyzed, the product was found to contain 30.1% $ZrO_2$, 24.3% $SiO_2$, 9.5% $H_2O$ and 2.3% $Na_2O$ and to have the composition of $0.15Na_2O.ZrO_2.0.70P_2O_5.2.31SiO_2.2.15H_2O$ in terms of oxide mole ratio. The product exhibited the same X-ray diffraction pattern, typical of amorphous products, as shown in FIG. 1. Curve (b) in FIG. 2 shows the result obtained by subjecting the product to differential thermal analysis. The Na-substituted solid product had the following properties.

| Color, shape: | |
|---|---|
| Colorless, transparent and hard particles | |
| Particle size: | |
| 10 to 24 mesh | 48.3% |
| 24 to 60 mesh | 51.5% |
| 60 to 100 mesh | 0.2% |
| Specific surface area: | 389 m²/g |
| True specific gravity: | 2.5 g/cc |
| pH: | 5.6 |
| Particle strength (24 to 60 mesh): | 0.5% |
| Packing density (24 to 60 mesh): | 956 g/l |
| Ability to adsorb water: | 23.8% |
| (25° C., R.H. 65%) | |

Figure 4:
FIG. 4 is an electron photomicrograph (3000×) of the particles of sodium-substituted zirconium phosphosilicate of the present invention.

FIG. 4 shows an electron photomicrograph (3000×) showing particles obtained by pulverizing the Na-substituted dry product in a mortar. It is seen that the product has a structure wherein layers are arranged with uniform orientation, indicating high strength of the particles. Although the present product has a slightly smaller specific surface area than the product of Example 1 due to the Na substitution, the pore radius distribution diagram thereof also shows a distinct peak at about 10 Å, revealing almost no pore radii of 100 Å or larger.

Such Na-substituted zirconium phosphosilicate is useful as a carrier for liquids which are volatile, toxic, explosive, corrosive or easy to scatter or splash and for active substances which are chemically or physically unstable, and also as water adsorbent, humidity sensor, etc.

EXAMPLES 3 to 8

A dried product having the composition of $ZrO_2.0.50P_2O_5.2.87SiO_2.2.90H_2O$ in terms of oxide mole ratio was further heat-treated at high temperatures.

The procedure of Example 1 was repeated except that the amounts of starting materials used in Example 1 were varied as given below. A 200.6 g quantity of a commercial sodium silicate solution (28.54% $SiO_2$ and 9.30% $Na_2O$) was diluted with 4000 ml of water. A diluted phosphoric acid solution containing 32.1 g of 85.08% phosphoric acid was used in an amount of 500 ml. A zirconium oxychloride solution was prepared by dissolving 106.2 g of $ZrOCl_2.8H_2O$ crystals (99.5%) and 45.0 ml of conc. hydrochloric acid into 2950 ml of water. The reaction gave a slurry having a $P_2O_5/ZrO_2$ mole ratio of 0.42 and a $SiO_2/ZrO_2$ mole ratio of 2.90. Chemical analysis showed that 137 g of the colorless, transparent, hard and granular product thus obtained contained 30.3% $ZrO_2$, 13.9% $P_2O_5$, 42.3% $SiO_2$ and 13.5% $H_2O$ and the product had the composition of $ZrO_2.0.40P_2O_5.2.87SiO_2.3.06H_2O$ in terms of oxide mole ratio. Table 1 given below shows the properties of the product dried at 105° C. Five portions each of 6 g of the product were placed in porcelain alumina crucibles and were heat-treated in electric furnaces each at temperatures of 250° C., 400° C., 500° C., 700° C. and 850° C., respectively for 4 hours. The portions thus heat-treated were left to stand for cooling and then withdrawn from the crucibles. Each portion was found identical in color and particle shape with the product simply dried at 105° C. X-ray diffraction indicated that each portion remained amorphous. The portions were subjected to chemical analysis to determine the amount of bound water, specific surface area, ability to adsorb water, true specific gravity and pH value, which are also shown in Table 1.

Table 1 shows that the products obtained in Examples 3 to 8 are excellent in heat resistance and maintain the excellent properties after heat-treatment at high temperatures.

TABLE I

| Example | Heat-treating temperature (°C.) | Bound water* ($nH_2O$) | Specific surface area ($m^2/g$) | Ability to adsorb water (%, at 25° C. and RH 65%) | True specific gravity (g/cc) | pH (3% aqueous dispersion) |
|---|---|---|---|---|---|---|
| 3 | 105 | 3.06 $H_2O$ | 430 | 25.6 | 2.5 | 3.5 |
| 4 | 250 | 1.19 $H_2O$ | 382 | 22.5 | 2.6 | 3.5 |
| 5 | 400 | 0.55 $H_2O$ | 345 | 22.0 | 2.7 | 3.5 |
| 6 | 500 | 0.36 $H_2O$ | 320 | 18.8 | 2.7 | 3.7 |
| 7 | 700 | 0.12 $H_2O$ | 318 | 17.5 | 2.7 | 3.8 |
| 8 | 850 | 0.05 $H_2O$ | 159 | 13.7 | 2.8 | 4.4 |

*The bound water is shown as the value n in the formula $ZrO_2.0.40P_2O_5.2.87SiO_2.nH_2O$ as expressed in terms of oxides.

EXAMPLE 9

A 188.9 g quantity of sodium silicate powder (a commercial product containing 52.56% $SiO_2$ and 25.10% $Na_2O$) was dissolved in 2000 ml of water. To the solution was added a phosphoric acid solution prepared by diluting 15.9 g of 89.06% phosphoric acid with 1800 ml of water. A 141 ml quantity of conc. hydrochloric acid was added to the mixture to obtain a transparent mixture. To the mixture was added with stirring over a period of 1 minute a zirconium chloride solution prepared by diluting 79.9 g of zirconium hydroxychloride (a commercial ZrOOHCl solution containing 35.5% $ZrO_2$) with 2000 ml of water. The slurry resulting from the reaction was found to have a $P_2O_5/ZrO_2$ mole ratio of 0.31 and a $SiO_2/ZrO_2$ mole ratio of 7.18. To the slurry was gradually added with stirring 500 ml of a 11.2% potassium hydroxide solution at 22° C. After the addition, the stirring was continued for 30 minutes to complete the ion exchange reaction. The ion-exchanged slurry thus obtained was filtered by a filter press after 2 hours and the cake was washed with desalinated water until no chlorine ions were present in the washings, whereby 2754 g of wet cake was obtained. The cake was dried at 60° C. by a hot air drier for 34 hours to give 161 g of a product substituted with alkali metal. X-ray diffraction confirmed that the product was amorphous. Chemical analysis revealed that the product contained 18.3% $ZrO_2$, 6.5% $P_2O_5$, 61.8% $SiO_2$, 10.6% $H_2O$, 0.8% $Na_2O$ and 2.0% $K_2O$ and that the product had the composition of $0.09Na_2O.0.14K_2O.ZrO_2.0.31P_2O_5.6.92SiO_2.3.94H_2O$ in terms of oxide mole ratio.

The product had the following properties: appearance of slightly milk white and hard particles, specific surface area of 551 $m^2/g$, true specific gravity of 2.4 g/cc, pH of 7.6 and ability to adsorb 40.5% of water based on the weight of the product (at 25° C. and R.H. 65%).

EXAMPLE 10

A 81.0 g quantity of sodium silicate powder (a commercial product containing 52.56% $SiO_2$ and 25.10% $Na_2O$) was dissolved in water to obtain 2000 ml of a silicon component solution. A 63.2 g quantity of phosphoric acid (89.06%) was dissolved in water to prepare 1200 ml of a phosphorus component solution. The two solutions were mixed together to provide a transparent mixture. To the mixture was rapidly added with stirring 2000 ml of a zirconium component solution prepared by diluting 119.8 g of zirconium hydroxychloride (an aqueous solution containing 35.5% $ZrO_2$) with water. The resulting slurry was subjected to chemical analysis with the results that a $P_2O_5/ZrO_2$ mole ratio was 0.83 and that a $SiO_2/ZrO_2$ mole ratio was 2.05. To the slurry was dropwise added with stirring 620 ml of a 11.2% potassium hydroxide solution. After the addition, the stirring was continued for 30 minutes and the mixture was aged at room temperature for 3 days. The mixture was filtered by a filter press and the cake obtained was washed with water until no chlorine ions were present in the washings when tested with silver nitrate. A 181.0 g quantity of wet cake was dried at 80° C. for 20 hours to obtain 147 g of a product. The dried product was found to be amorphous, and chemical analysis revealed that the product contained 29.3% $ZrO_2$, 28.4% $P_2O_5$, 26.8% $SiO_2$, 1.6% $Na_2O$, 3.6% $K_2O$ and 10.3% $H_2O$ and that the product had the composition of $0.11Na_2O.0.16K_2O.ZrO_2.0.84P_2O_5.1.87SiO_2.2.40H_2O$ in terms of oxide mole ratio.

The product was found to have the following properties: appearance of white and hard particles, specific surface area of 417 m$^2$/g, true specific gravity of 2.6 g/cc, pH of 7.4 and ability to adsorb 54.7% of water based on the weight of the product (at 25° C. and R.H. 65%).

EXAMPLE 11

A 134.9 g quantity of sodium silicate powder (52.56% $SiO_2$ and 25.10% $Na_2O$) was dissolved in water to obtain 2000 ml of a silicon component solution. To the solution was added 1200 ml of an aqueous solution containing 47.8 g of 89.06% phosphoric acid to prepare a transparent mixture to which was added 45 ml of conc. hydrochloric acid. To the mixture was rapidly added with stirring 2000 ml of a zirconium component solution prepared by diluting 79.9 g of zirconium hydroxychloride (35.5% $ZrO_2$) with water and a slurry containing a precipitate was formed. The slurry, when chemically analyzed, was found to have a $P_2O_5/ZrO_2$ mole ratio of 0.94 and a $SiO_2/ZrO_2$ mole ratio of 5.13. A 320 ml quantity of a 11.2% potassium hydroxide solution was dropwise added to the slurry with stirring so that the pH of the slurry was not locally increased to a highly alkaline level. After the addition, the stirring was continued for 30 minutes, and the slurry was thereafter aged at room temperature for a day and filtered by a filter press. The cake was washed with water and dewatered to obtain 2215 g of wet cake. The cake was dried at 105° C. to provide 140 g of a product. The dried product was amorphous and chemical analysis demonstrated that the product contained 20.6% $ZrO_2$, 22.3% $P_2O_5$, 42.6% $SiO_2$, 1.4% $Na_2O$, 2.7% $K_2O$ and 10.4% $H_2O$ and that the product had the composition of $0.14Na_2O.0.17K_2O.ZrO_2.0.94P_2O_5.4.24SiO_2.3.45H_2O$ in terms of oxide mole ratio.

The product had the following properties: appearance of milk white and hard particles, specific surface area of 483 m$^2$/g, true specific gravity of 2.4 g/cc, pH of 7.2 and ability to adsorb 38.5% of water based on the weight of the product (at 25° C. and R.H. 65%).

EXAMPLE 12

The procedure of Example 9 was repeated with the exception of using the amounts of stating materials as described below and conducting the aging in the following manner.

A 1200 ml quantity of an aqueous solution containing 31.8 g of 89.06% phosphoric acid was added to 2000 ml of a silicon component solution prepared by dissolving 134.9 g of sodium silicate powder (52.56% $SiO_2$) in water. The mixture was mixed with 76 ml of conc. hydrochloric acid and then with 2000 ml of a solution obtained by diluting 119.8 g of of zirconium hydroxychloride (35.5% $ZrO_2$) in water, whereby there was produced a slurry with a $P_2O_5/ZrO_2$ mole ratio of 0.42 and a $SiO_2/ZrO_2$ mole ratio of 3.42. To the slurry was dropwise added 660 ml of a 11.2% potassium hydroxide solution and the mixture was aged at room temperature for 5 days to give 2162 g of wet cake and 161 g of dried product. The dry product was found to contain 26.9% $ZrO_2$, 13.0% $P_2O_5$, 44.1% $SiO_2$, 0.8% $Na_2O$, 2.9% $K_2O$ and 12.3% $H_2O$ and to have the composition of $0.06Na_2O.0.14K_2O.ZrO_2.0.42P_2O_5.3.36SiO_23.14H_2O$ in terms of oxide mole ratio.

The product exhibited the following properties: appearance of white and hard particles, specific surface area of 418 m$^2$/g, true specific gravity of 2.2 g/cc, pH of 8.2 and ability to adsorb 49.0% of water based on the weight of the product (at 25° C. and R.H. 65%).

EXAMPLE 13

The procedure of Example 9 was repeated with the exception of using the materials employed in Example 9 in different amounts as described below and conducting the aging in the manner stated below.

A 1800 ml quantity of an aqueous solution containing 63.2 g of phosphoric acid (89.06%) was added to 3200 ml of a silicon component solution prepared by dissolving 54.0 g of sodium silicate powder (52.56% $SiO_2$) in water. To the mixture was rapidly mixed with stirring 2000 ml of a zirconium component solution prepared by diluting 159.8 g of of zirconium hydroxychloride (35.5% $ZrO_2$) in water, whereby a slurry was obtained which had a $P_2O_5/ZrO_2$ mole ratio of 0.63 and a $SiO_2/ZrO_2$ mole ratio of 1.02. To the slurry was dropwise added 840 ml of a 11.2% potassium hydroxide solution and the mixture was heated at 80° C. for 1 hour and was aged at room temperature for 5 days, giving 1368 g of wet cake and 138 g of dried product. The dried product was found to contain 42.0% $ZrO_2$, 30.4% $P_2O_5$, 12.3% $SiO_2$, 0.4% $Na_2O$, 3.5% $K_2O$ and 11.4% $H_2O$ and to have the composition of $0.02Na_2O.0.11K_2O.ZrO_2.0.63P_2O_5.0.60SiO_2.1.86H_2O$ in terms of oxide mole ratio.

The product had the following properties: appearance of white and hard particles, specific surface area of 307 m$^2$/g, pH of 7.5, ability to adsorb 52.0% of water based on the weight of the product (at 25° C. and R.H. 65%), and true specific gravity of 2.7 g/cc,

EXAMPLE 14

The procedure of Example 9 was repeated with the exception of using the following materials in different amounts as given below and performing the aging in the following manner.

A 1000 ml quantity of an aqueous solution containing 15.9 g of 89.06% phosphoric acid was mixed with 4000 ml of a silicon component solution prepared by dissolving 215.9 g of sodium silicate powder (52.56% $SiO_2$) into water. To the mixture was added 138 ml of conc. hydrochloric acid to provide a transparent mixture. There was rapidly added to the transparent mixture with stirring 2000 ml of a zirconium component solution prepared by diluting 39.9 g of zirconium hydroxychloride (35.5% $ZrO_2$) with water to give a slurry having a $P_2O_5/ZrO_2$ mole ratio of 0.63 and a $SiO_2/ZrO_2$ mole ratio of 16.44. The slurry was aged at room temperature for 2 hours and thereto was dropwise added 170 ml of a 11.2% potassium hydroxide solution. The mixture was left to stand at room temperature for 2 hours and then subjected to filtration, affording 2119 g of wet cake and 144 g of dried product. The product was found to contain 10.0% $ZrO_2$, 7.2% $P_2O_5$, 74.0% $SiO_2$, 7.2% $H_2O$, 0.7% $Na_2O$, and 0.9% $K_2O$, and to have the composition of $0.14Na_2O.0.12K_2O.ZrO_2.0.63P_2O_5.15.19SiO_4.4.93H_2O$ in terms of oxide mole ratio.

The product had the following properties: appearance of slightly milk white and hard particles, specific surface area of 597 m$^2$/g, true specific gravity of 2.3 g/cc, pH of 8.0 and ability to adsorb 50.9% of water based on the weight of the product (at 25° C. and R.H. 60%).

EXAMPLE 15

The procedure of Example 9 was repeated with the exception of using the following materials in different amounts as shown below and conducting the the following aging.

A 279.7 ml quantity of a zirconium hydroxychloride solution (35.5% $ZrO_2$) and 21 ml of conc. hydrochloric acid were added to water to provide 4000 ml of a zirconium component solution. Thereto was added with such vigorous stirring as to prevent precipitation 1000 ml of a silicon component solution prepared by dissolving 54.0 g of sodium silicate powder (52.56% $SiO_2$) in water. The reaction gave a transparent mixture to which was rapidly added with stirring 2000 ml of a phosphorus component solution obtained by diluting 15.9 g of phosphoric acid (89.06%) with water. The slurry thus formed had a $P_2O_5/ZrO_2$ mole ratio of 0.09 and a $SiO_2/ZrO_2$ mole ratio of 0.59. The slurry was heated at 50° C. for 1 hour and aged at room temperature for a day. To the slurry was dropwise added with stirring 1570 ml of a 11.2% aqueous solution of potassium hydroxide and the mixture was further stirred for 30 minutes, filtered and washed with water, giving 2165 g of wet cake and 158 g of dried product. The product was found to contain 63.7% $ZrO_2$, 6.6% $P_2O_5$, 16.2% $SiO_2$, 12.8% $H_2O$, 0.3% $Na_2O$, and 0.5% $K_2O$, and to have the composition of $0.01Na_2O.0.01K_2O.ZrO_2.0.09P_2O_5.052SiO_2.1.38H_2O$ in terms of oxide mole ratio.

The product had the following properties: appearance of colorless, transparent and hard particles, specific surface area of 263 m$^2$/g, true specific gravity of 2.9 g/cc, pH of 5.9 and ability to adsorb 16.5% of water based on the weight of the product (at 25° C. and R.H. 65%).

EXAMPLE 16

The procedure of Example 9 was repeated with the exception of varying the amounts of starting materials used in Example 9 as described below and performing the following aging.

A 2000 ml quantity of an aqueous solution containing 15.9 g of phosphoric acid (89.06%) was added to 3000 ml of a solution containing 160.0 g of sodium silicate powder (52.56% $SiO_2$) in water. To the mixture were added 97 ml of conc. hydrochloric acid and also 2000 ml of an aqueous solution containing 119.8 g of zirconium hydroxychloride (35.5% $ZrO_2$) to obtain a slurry having a $P_2O_5/ZrO_2$ mole ratio of 0.21 and a $SiO_2/ZrO_2$ mole ratio of 4.06. To the slurry was added 600 ml of a 11.2% potassium hydroxide solution. After completion of the reaction, the mixture was aged at room temperature for 7 days and was subjected to filtration to give 2718 g of wet cake and 158 g of dried product. The dry product was found to contain 27.5% $ZrO_2$, 6.6% $P_2O_5$, 48.7% $SiO_2$, 13.2% $H_2O$, 1.3% $Na_2O$, and 2.7% $K_2O$, and to have the composition of $0.09Na_2O.0.13K_2O.ZrO_2. 0.21P_2O_5.3.64SiO_2.3.29H_2O$ in terms of oxide, mole ratio.

The product had the following properties: appearance of colorless, transparent and hard particles, specific surface area of 418 m$^2$/g, true specific gravity of 2.5 g/cc, pH of 9.0 and ability to adsorb 24.8% of water based on the weight of the product (at 25° C. and R.H. 65%).

EXAMPLE 17

The procedure of Example 9 was repeated with the exception of using the starting materials as employed in Example 9 in different amounts as shown below and performing the following aging.

A 3000 ml quantity of a silicon component solution prepared by dissolving 108.0 g of sodium silicate powder (52.56% $SiO_2$) in water was added, with such vigorous stirring as to prevent precipitation, to 4000 ml of an aqueous solution containing 79.9 g of zirconium hydroxychloride (35.5% $ZrO_2$) to obtain a transparent mixture. To the mixture was rapidly added with stirring 1000 ml of an aqueous solution containing 63.2 g of phosphoric acid (89.06%) to prepare a slurry having a $P_2O_5/ZrO_2$ mole ratio of 1.25 and a $SiO_2/ZrO_2$ mole ratio of 4.11. To the slurry was dropwise added 270 ml of a 11.2% potassium hydroxide solution and the mixture was aged at room temperature for 3 days to obtain 1764 g of wet cake and 127 g of dried product. The product was found to contain 21.4% $ZrO_2$, 31.1% $P_2O_5$, 33.7% $SiO_2$, 9.0% $H_2O$, 1.8% $Na_2O$, and 3.0% $K_2O$, and to have the composition of $0.17Na_2O.0.18K_2O.ZrO_2.1.26P_2O_5. 3.22SiO_2.2.88H_2O$ in terms of oxide mole ratio.

The product exhibited the following properties: appearance of milk white and and hard particles, specific surface area of 416 m$^2$/g, true specific gravity of 2.5 g/cc, pH of 7.4 and ability to adsorb 33.85% of water based on the weight of the product (at 25° C. and R.H. 65%).

EXAMPLE 18

The H-type product obtained in Example 1 and having the composition of $ZrO_2.0.70P_2O_5.2.31SiO_2.2.47H_2O$ in terms of oxide mole ratio was subjected to ion exchange with use of cesium.

A 48.8 g quantity of cesium chloride (99.8%) in place of the sodium chloride used in Example 2 was dissolved in water to provide 1160 ml of an ion exchange solution. The procedure of Example 2 was repeated with the exception of varying the kind of cation, the concentration of the ion exchange solution and the amount of the solution passing through the column. The resulting cesium-substituted product was subjected to chemical analysis and was found to contain 27.9% $ZrO_2$, 22.5% $P_2O_5$, 31.4% $SiO_2$, 8.7% $H_2O$ and 9.5% $Cs_2O$ and to have the composition of $0.15Cs_2O.ZrO_2.0.70P_2O_5.2.31SiO_2.2.13H_2O$ in terms of oxide mole ratio.

The product displayed the following properties: appearance of colorless, transparent and hard particles, specific surface area of 385 m$^2$/g, ability to adsorb 20.8% of water based on the weight of the product (at 25° C. and R.H. 65%), true specific gravity of 2.6 g/cc and pH of 5.3.

EXAMPLE 19

The procedure of Example 2 was repeated with the exception of using 920 ml of a solution prepared by dissolving in water 65.5 g of potassium alum [$K_2Al_2(SO_4)_4.24H_2O$] in place of the sodium chloride as used in Example 2, as a potassium- and aluminum-containing solution for ion exchange. The cake was washed repeatedly with water until no sulfate ions were detected in the washings with use of a barium nitrate solution. The product was found to contain 29.6% $ZrO_2$, 23.9% $P_2O_5$, 33.3% $SiO_2$, 11.0% $H_2O$, 0.2% $K_2O$ and 2.0% $Al_2O_3$ and to have the composition of $0.01K_2O.0.08Al_2O_3.ZrO_2.0.70P_2O_5.2.31SiO_2.2.55H_2O$ in terms of oxide mole ratio.

The properties of the product were as follows: appearance of colorless, transparent and hard particles, specific surface area of 410 $m^2/g$, ability to adsorb 23.7% of water based on the weight of the product (at 25° C. and R.H. 65%), true specific gravity of 2.5 g/cc and pH of 4.5. Differential thermal analysis was conducted with the results shown with Curve (c) in FIG. 2.

EXAMPLE 20

The procedure of Example 2 was repeated except that 21.6 g of $COCl_2.6H_2O$ (99.0%) in place of the sodium chloride used in Example 2 was dissolved in water to provide 360 ml of an ion exchange solution.

The resulting product was found to contain 29.7% $ZrO_2$, 24.0% $P_2O_5$, 33.5% $SiO_2$, 12.1% $H_2O$ and 0.7% CoO, and to have the composition of $0.04CoO.ZrO_2.0.70P_2O_5.2.31SiO_2.2.79H_2O$ in terms of oxide mole ratio.

The product exhibited the following properties: appearance of blue, transparent and hard particles, specific surface area of 399 $m^2/g$, ability to adsorb 24.4% of water based on the weight of the product (at 25° C. and R.H. 65%), true specific gravity of 2.5 g/cc and pH of 4.1.

EXAMPLES 21 to 25

The procedure of Example 2 was repeated with the exception of using, as a solution for ion exchange reaction, the solutions of salts listed in Table 2 given below in place of the sodium chloride as used in Example 2, thus giving products substituted with metals. The product was subjected to chemical analysis. Table 3 given below shows the results of the analysis and the compositions in terms of oxide mole ratio and Table 4 below indicates the properties and the appearances of the products.

TABLE 2

| Example | Metal salt Kind | Amount (g) | Amount of sol. (ml) |
|---|---|---|---|
| 21 | $CaCl_2.2H_2O$ | 40.0 | 680 |
| 22 | $ZnCl_2$ | 20.0 | 400 |
| 23 | $MnCl_2.4H_2O$ | 10.0 | 350 |
| 24 | $NiCl_2.6H_2O$ | 15.4 | 320 |
| 25 | $FeSO_4Na_2SO_4.6H_2O$ | 47.1 | 600 |

TABLE 3

| Example | $ZrO_2$ | $P_2O_5$ | $SiO_2$ | $H_2O$ | Oxide of ion-exchange metal | | Composition* (mole ratio) Ion-exchange metal ($mM_{2/T}O$) | Bound water ($nH_2O$) |
|---|---|---|---|---|---|---|---|---|
| 21 | 29.8 | 24.1 | 33.6 | 12.0 | CaO | 0.5 | 0.04 CaO | 2.74 $H_2O$ |
| 22 | 29.7 | 23.9 | 33.4 | 11.2 | ZnO | 1.8 | 0.09 ZnO | 2.59 $H_2O$ |
| 23 | 29.8 | 24.0 | 33.6 | 12.0 | MnO | 0.6 | 0.03 MnO | 2.76 $H_2O$ |
| 24 | 29.8 | 24.0 | 33.6 | 12.2 | NiO | 0.4 | 0.02 NiO | 2.81 $H_2O$ |
| 25 | 29.3 | 23.6 | 33.0 | 10.3 | $Fe_2O_3$ | 3.8 | 0.10 $Fe_2O_3$ | 2.42 $H_2O$ |

*The mole ratios of the ion exchange metals and the bound water correspond to the respective values in the formula of the product
$mM_{2/T}O.ZrO_2.0.70P_2O_5.2.31SiO_2.nH_2O$ in terms of oxide mole ratio.

TABLE 4

| Example | Specific surface area ($m^2/g$) | Ability to adsorb water (%) (25° C., RH 65%) | True specific gravity (g/cc) | pH | Appearance |
|---|---|---|---|---|---|
| 21 | 386 | 24.4 | 2.5 | 4.4 | Slightly pale yellow, transparent and hard particle |
| 22 | 385 | 24.1 | 2.5 | 4.5 | Colorless, transparent and hard particle |
| 23 | 401 | 24.1 | 2.5 | 4.4 | Slightly pale pink, transparent and hard particle |
| 24 | 417 | 24.4 | 2.5 | 4.4 | Pale green, transparent and hard particle |
| 25 | 394 | 23.8 | 2.6 | 5.1 | Slightly pale yellow, transparent and hard particle |

EXAMPLE 26

A 401.8 g quantity of commercial $Na_2SiO_3.9H_2O$ (19.6% $SiO_2$, 21.2% $Na_2O$) was dissolved in water to provide 3500 ml of a sodium silicate solution. A 88.9 g quantity of $ZrO(NO_3)_2.2H_2O$ (99.2%) and 105.0 ml of conc. nitric acid (a product of special grade according to JIS) were mixed with water to obtain 3500 ml of acidic zirconium nitrate solution. A 60.6 g quantity of phosphoric acid (85.08%) was diluted with water to give 3500 ml of a phosphoric acid solution. The 3 kinds of solutions were each placed in 3 respective dropping funnels over a reactor containing 2000 ml of water, which funnels were adjusted to drop the solutions at the same rate into the reactor. The dropping continued for 4 minutes while vigorously agitating the contents of the reactor. The reaction gave a slurry having a $P_2O_5/ZrO_2$ mole ratio of 0.80 and a $SiO/ZrO_2$ ratio of 3.97. The slurry was aged at room temperature for 3 days and was subjected to filtration. The cake obtained was washed with 6000 ml of desalinated water and then dewatered to obtain 2390 g of hydrogel. The wet cake thus obtained was dried at 105° C. to provide 164 g of solids. Chemical analysis revealed that the product contained 25.0% $ZrO_2$, 23.0% $P_2O_5$, 40.0% $SiO_2$ and 12.0% $H_2O$, and had the composition of $ZrO_2.0.80P_2O_5.3.28SiO_2.3.28H_2O$ in terms of oxide mole ratio.

The product exhibited the following properties: appearance of slightly milk white and hard particles, specific surface area of 461 m$^2$/g, true specific gravity of 2.5 g/cc, pH of 3.5 and ability to adsorb 29.1% of water (25° C., RH 65%), based on the weight of the product.

For ion substitution, the product (135.0 g) was placed in a polyethylene reactor equipped with a stirrer and 300 ml of desalinated water was added. A 15.0 g quantity of potassium hydroxide and 20.4 g of potassium chloride were dissolved in 360 ml of water, and the solution was dropwise added with stirring to the contents of the reactor. The ion exchange was performed with a pH of less than 10. After the addition, the stirring continued for 90 minutes with the result that the upper portion in the ion exchange solution showed a pH of 7.5. The potassium-containing product thus obtained was subjected to a filtration with a glass filter and the cake was washed with 2700 ml of deionized water and dried at 80° C. The dry product was found to contain 22.9% $ZrO_2$, 21.2% $P_2O_5$, 36.7% $SiO_2$, 10.8% $H_2O$ and 8.4% $K_2O$, and to have the composition of $0.48K_2O.ZrO_2.0.80P_2O_5.3.28SiO_2.3.21H_2O$ in terms of oxide mole ratio.

The product exhibited the following properties: appearance of colorless, transparent and hard particles, specific surface area of 385 m$^2$/g, pH of 7.0, true specific gravity of 2.6 g/cc and ability to adsorb 24.7% of water based on the weight of the product (25° C., R.H. 65%)

EXAMPLES 27 to 32

Portions of the H-type product obtained in the first procedure of Example 26 and having the composition of $ZrO_2.0.80P_2O_5.3.28SiO_2.3.28H_2O$ in terms of oxide mole ratio were subjected to ion exchange by use of metals.

The ion exchange procedure of Example 26 was repeated by using 120.0 g of the dried product obtained in the first procedure of Example 26 with the exception of using, as an ion exchange solution, the solutions of metal salts shown in Table 5 given below in place of the sodium salt, thus giving products substituted with metals. Table 6 indicates the results of chemical analysis conducted with the products calculated as oxides and the compositions in terms of oxide mole ratio. Table 7 below shows the appearance and properties of the products.

TABLE 5

| Example | Metal salt Kind | Amount (g) | Amount of sol. (ml) |
|---|---|---|---|
| 27 | $CaCl_2.2H_2O$ | 8.0 | 220 |
| 28 | $AgNO_3$ | 9.8 | 200 |
| 29 | $LaCl_3.7H_2O$ | 25.5 | 350 |
| 30 | $CrCl_3.6H_2O$ | 30.0 | 550 |
| 31 | $MgCl_2.6H_2O$ | 21.0 | 420 |
| 32 | $YCl_3$ | 25.0 | 600 |

TABLE 6

| Example | Result of chemical analysis (%) | | | | | | Composition* (mole ratio) Ion-exchange metal $(m\frac{M_2O}{T})$ | Bound water $(nH_2O)$ |
|---|---|---|---|---|---|---|---|---|
| | $ZrO_2$ | $P_2O_5$ | $SiO_2$ | $H_2O$ | Oxide of ion-exchange metal | | | |
| 27 | 24.9 | 22.9 | 39.7 | 12.0 | CuO | 0.5 | 0.03 CuO | 3.30 $H_2O$ |
| 28 | 24.7 | 22.8 | 39.5 | 11.1 | $Ag_2O$ | 1.9 | 0.04 $Ag_2O$ | 3.09 $H_2O$ |
| 29 | 24.3 | 22.4 | 38.8 | 11.3 | $La_2O_3$ | 3.2 | 0.05 $La_2O_3$ | 3.17 $H_2O$ |
| 30 | 24.9 | 22.9 | 39.8 | 11.8 | $Cr_2O_3$ | 0.6 | 0.02 $Cr_2O_3$ | 3.25 $H_2O$ |
| 31 | 24.8 | 22.9 | 39.6 | 12.2 | MgO | 0.5 | 0.06 MgO | 3.38 $H_2O$ |
| 32 | 24.1 | 22.2 | 38.6 | 11.1 | $Y_2O_3$ | 4.0 | 0.09 $Y_2O_3$ | 3.15 $H_2O$ |

*The values of the ion-exchange metals and bound water are as explained hereinbefore in respect of Table 3.

TABLE 7

| Example | Specific surface area (m$^2$/g) | Ability to adsorb water (%) (25° C., RH 65%) | True specific gravity (g/cc) | pH | Appearance |
|---|---|---|---|---|---|
| 27 | 455 | 29.0 | 2.5 | 3.5 | Pale blue, transparent and hard particle |
| 28 | 431 | 28.5 | 2.5 | 3.7 | Colorless, transparent and hard particle |
| 29 | 424 | 28.3 | 2.5 | 3.9 | Colorless, transparent and hard particle |
| 30 | 457 | 29.1 | 2.5 | 3.5 | Slightly yellow, transparent and hard particle |
| 31 | 425 | 28.8 | 2.5 | 3.9 | Colorless particle |
| 32 | 418 | 27.6 | 2.6 | 4.1 | Colorless particle |

We claim:

1. A process for producing an amorphous zirconium phosphosilicate represented by the formula $Zr(PO_4)_{2y}(SiO_2)_z \cdot n'H_2O$ wherein y is 0.02 to 2.00, z is 0.05 to 16.00 and n' is 0 to 10.00 comprising:
   (i) preparing respective aqueous solutions of a zirconium compound, a phosphorus compound and a silicon compound in a $P_2O_5/ZrO_2$ mole ratio of 0.02 to 2.50 and a $SiO_2/ZrO_2$ mole ratio of 0.05 to 20.00;
   (ii) mixing together said aqueous solutions so that the resulting slurry contains an end product in an amount of up to 20% by weight;
   (iii) aging the resulting slurry containing the reaction product at about 5° to about 100° C. for about 1 to 240 hours;
   (iv) washing the resulting precipitate;
   (v) subjecting the precipitate to solid-liquid separation;
   (vi) drying the wet cake obtained at a temperature of up to about 250° C.; and
   (vii) optionally heating the dried cake at about 250° to about 950° C.

2. A process as defined in claim 1 wherein the zirconium compound is at least one salt chosen from the group consisting of mineral acid salts, organic acid salts and complex salts.

3. A process as defined in claim 2 wherein the zirconium compound is at least one of zirconium oxychloride, zirconium hydroxychloride, zirconyl sulfate and zirconyl nitrate.

4. A process as defined in claim 1 wherein the phosphorus compound is at least one of phosphoric acid, pyrophosphoric acid, condensation phosphoric acid and alkali metal salts and ammonium salts of these acids.

5. A process as defined in claim 4 wherein the phosphorus compound is phosphoric acid and/or sodium phosphate.

6. A process as defined in claim 1 wherein the silicon compound is at least one of silicic acid, alkali silicates, water glass silicate and colloidal silica.

7. A process as defined in claim 6 wherein the silicon compound is at least one of sodium silicate, sodium metasilicate and water glass silicate.

8. A process as defined in claim 1 wherein the reaction is conducted at a temperature of about 5° to about 70° C.

9. A process as defined in claim 1 wherein the drying is conducted at a temperature of about 40° to about 150° C.

10. A process for producing an amorphous zirconium phosphosilicate represented by the formula $M_{2/l}Zr(PO_4)_{2y}(SiO_2)_z \cdot n'H_2O$ wherein M is a cation, l is the valence of the cation, y is 0.02 to 2.00, z is 0.05 to 16.00 and n' is 0 to 9.00 comprising:
   (i) preparing respective aqueous solutions of a zirconium compound, a phosphorous compound and a silicon compound in a $P_2O_5/ZrO_2$ mole ratio of 0.02 to 2.50 and a $SiO_2/ZrO_2$ mole ratio of 0.05 to 20.00, with at least one kind of cation incorporated in at least one of said aqueous solutions;
   (ii) mixing together said aqueous solutions so that the resulting slurry contains an end product in an amount of up to 20% by weight;
   (iii) aging the resulting slurry containing the reaction product at about 5° to about 100° C. for about 1 to 240 hours;
   (iv) washing the resulting precipitate;
   (v) subjecting the precipitate to solid-liquid separation;
   (vi) drying the wet cake obtained at a temperature of up to about 250° C.; and
   (vii) optionally heating the dried cake at about 250° to about 950° C.

11. A process as defined in claim 10 wherein the zirconium compound is at least one salt chosen from the group consisting of mineral acid salts, organic acid salts and complex salts.

12. A process as defined in claim 11 wherein the zirconium compound is at least one of zirconium oxychloride, zirconium hydroxychloride, zirconyl sulfate and zirconyl nitrate.

13. A process as defined in claim 10 wherein the phosphorus compound is at least one of phosphoric acid, pyrophosphoric acid, condensation phosphoric acid and alkali metal salts and ammonium salts of these acids.

14. A process as defined in claim 13 wherein the phosphorus compound is phosphoric acid and/or sodium phosphate.

15. A process as defined in claim 10 wherein the silicon compound is at least one of silicic acid, alkali silicates, water glass silicate and colloidal silica.

16. A process as defined in claim 15 wherein the silicon compound is at least one of sodium silicate, sodium metasilicate and water glass silicate.

17. A process as defined in claim 10 wherein the reaction is conducted at a temperature of about 5° to about 70° C.

18. A process as defined in claim 10 wherein the drying is conducted at a temperature of about 40° to about 150° C.

19. A process as defined in claim 10 wherein the cation is at least one ion chosen from the group consisting of $NH_4^+$ and ions formed from metals of Group 1A, Group 1B, Group 2A, Group 2B, Group 3A, Group 3B, Group 5A, Group 6A, Group 7A and Group 8 of the Periodic Table.

20. A process for producing an amorphous zirconium phosphosilicate represented by the formula $M_{2/l}Zr(PO_4)_{2y}(SiO_2)_z \cdot n'H_2O$ wherein M is a cation, l is the valence of the cation, y is 0.02 to 2.00, z is 0.05 to 16.00 and n' is 0 to 9.00 comprising:
   (i) preparing respective aqueous solutions of a zirconium compound, a phosphorus compound and a silicon compound in a $P_2O_5/ZrO_2$ mole ratio of 0.02 to 2.50 and $SiO_2/ZrO_2$ mole ratio of 0.05 to 20.00 and a solution containing at least one kind of cation;
   (ii) mixing together said aqueous solutions so that the resulting slurry contains an end product in an amount of up to 20% by weight;
   (iii) aging the resulting slurry containing the reaction product at about 5° to about 100° C. for about 1 to 240 hours;
   (iv) washing the resulting precipitate;
   (v) subjecting the precipitate to solid-liquid separation;
   (vi) drying the wet cake obtained at a temperature of up to about 250° C.; and
   (vii) optionally heating the dried cake at about 250° to about 950° C.

21. A process as defined in claim 20 wherein the zirconium compound is at least one salt chosen from the group consisting of mineral acid salts, organic acid salts and complex salts.

22. A process as defined in claim 21 wherein the zirconium compound is at least one of zirconium oxychloride, zirconium hydroxychloride, zirconyl sulfate and zirconyl nitrate.

23. A process as defined in claim 20 wherein the phosphorus compound is at least one of phosphoric acid, pyrophosphoric acid, condensation phosphoric acid and alkali metal salts and ammonium salts of these acids.

24. A process as defined in claim 23 wherein the phosphorus compound is phosphoric acid and/or sodium phosphate.

25. A process as defined in claim 20 wherein the silicon compound is at least one of silicic acid, alkali silicates, water glass silicate and colloidal silica.

26. A process as defined in claim 25 wherein the silicon compound is at least one of sodium silicate, sodium metasilicate and water glass silicate.

27. A process as defined in claim 20 wherein the reaction is conducted at a temperature of about 5° to about 70° C.

28. A process as defined in claim 20 wherein the drying is conducted at a temperature of about 40° to about 150° C.

29. A process as defined in claim 20 wherein the cation is at least one ion chosen from the group consisting of $NH_4^+$ and ions formed from metals of Group 1A, Group 1B, Group 2A, Group 2B, Group 3A, Group 3B, Group 5A, Group 6A, Group 7A and Group 8 of the Periodic Table.

30. A process for producing an amorphous zirconium phosphosilicate represented by the formula $M_{2/l}Zr(PO_4)_{2y}(SiO_2)_z \cdot n'H_2O$ wherein M is a cation, l is the valence of the cation, y is 0.02 to 2.00, z is 0.05 to 16.00 and n' is 0 to 9.00 comprising:
(i) preparing respective aqueous solutions of a zirconium compound, a phosphorus compound and a silicon compound in a $P_2O_5/ZrO_2$ mole ratio of 0.02 to 2.50 and $SiO_2/ZrO_2$ mole ratio of 0.05 to 20.00;
(ii) mixing together said aqueous solutions so that the resulting slurry contains an end product in an amount of up to 20% by weight;
(iii) admixing at least one kind of cation with the resulting slurry containing the reaction product;
(iv) aging the resulting mixture containing the reaction product of about 5° to about 100° C. for about 1 to 240 hours;
(v) washing the resulting precipitate;
(vi) subjecting the precipitate to solid-liquid separation;
(vii) drying the wet cake obtained at a temperature of up to about 250° C.; and
(viii) optionally heating the dried cake at about 250° to about 950° C.

31. A process as defined in claim 30 wherein the zirconium compound is at least one salt chosen from the group consisting of mineral acid salts, organic acid salts and complex salts.

32. A process as defined in claim 31 wherein the zirconium compound is at least one of zirconium oxychloride, zirconium hydroxychloride, zirconyl sulfate and zirconyl nitrate.

33. A process as defined in claim 30 wherein the phosphorus compound is at least one of phosphoric acid, pyrophosphoric acid, condensation phosphoric acid and alkali metal salts and ammonium salts of these acids.

34. A process as defined in claim 33 wherein the phosphorus compound is phosphoric acid and/or sodium phosphate.

35. A process as defined in claim 30 wherein the silicon compound is at least one of silicic acid, alkali silicates, water glass silicate and colloidal silica.

36. A process as defined in claim 35 wherein the silicon compound is at least one of sodium silicate, sodium metasilicate and water glass silicate.

37. A process as defined in claim 30 wherein the reaction is conducted at a temperature of about 5° to about 70° C.

38. A process as defined in claim 30 wherein the drying is conducted at a temperature of about 40° to about 150° C.

39. A process as defined in claim 30 wherein the cation is at least on ion chosen from the group consisting of $NH_4^+$ and ions formed from metals of Group 1A, Group 1B, Group 2A, Group 2B, Group 3A, Group 3B, Group 5A, Group 6A, Group 7A and Group 8 of the Periodic Table.

40. A process for producing an amorphous zirconium phosphosilicate represented by the formula $M_{2/l}Zr(PO_4)_{2y}(SiO_2)_z \cdot n'H_2O)$ wherein M is a cation, l is the valence of the cation, y is 0.02 to 2.00, z is 0.05 to 16.00 and n' is 0 to 9.00 comprising:
(i) preparing respective aqueous solutions of a zirconium compound, a phosphorus compound and a silicon compound in a $P_2O_5/ZrO_2$ mole ratio of 0.02 to 2.50 and $SiO_2/ZrO_2$ mole ratio of 0.05 to 20.00;
(ii) mixing together said aqueous solutions so that the resulting slurry contains an end product in an amount of up to 20% by weight;
(iii) aging the resulting slurry containing the reaction product at about 5° to about 100° C. for about 1 to 240 hours;
(iv) washing the resulting precipitate;
(v) subjecting the precipitate to solid-liquid separation;
(vi) admixing at least one kind of cation with the wet cake obtained;
(vii) drying the wet cake at a temperature of up to about 250° C.; and
(viii) optionally heating the dried cake at about 250° to about 950° C.

41. A process as defined in claim 40 wherein the zirconium compound is at least one salt chosen from the group consisting of mineral acid salts, organic acid salts and complex salts.

42. A process as defined in claim 41 wherein the zirconium compound is at least one of zirconium oxychloride, zirconium hydroxychloride, zirconyl sulfate and zirconyl nitrate.

43. A process as defined in claim 40 wherein the phosphorus compound is at least one of phosphoric acid, pyrophosphoric acid, condensation phosphoric acid and alkali metal salts and ammonium salts of these acids.

44. A process as defined in claim 43 wherein the phosphorus compound is phosphoric acid and/or sodium phosphate.

45. A process as defined in claim 40 wherein the silicon compound is at least one of silicic acid, alkali silicates, water glass.silicate and colloidal silica.

46. A process as defined in claim 45 wherein the silicon compound is at least one of sodium silicate, sodium metasilicate and water glass silicate.

47. A process as defined in claim 40 wherein the reaction is conducted at a temperature of about 5° to about 70° C.

48. A process as defined in claim 40 wherein the drying is conducted at a temperature of about 40° to about 150° C.

49. A process as defined in claim 40 wherein the cation is at least one ion chosen from the group consisting of $NH_4^+$ and ions formed from metals of Group 1A, Group 1B, Group 2A, Group 2B, Group 3A, Group 3B, Group 5A, Group 6A, Group 7A and Group 8 of the Periodic Table.

50. A process for producing an amorphous zirconium phosphosilicate represented by the formula $M_{2/l}Zr(PO_4)_{2y}(SiO_2)_z \cdot n'H_2O$ wherein M is a cation, l is the valence of the cation, y is 0.02 to 2.00, z is 0.05 to 16.00 and n' is 0 to 9.00 comprising:

(i) preparing respective aqueous solutions of a zirconium compound, a phosphorus compound and a silicon compound in a $P_2O_5/ZrO_2$ mole ratio of 0.02 to 2.50 and a $SiO_2/ZrO_2$ mole ratio of 0.05 to 20.00;

(ii) mixing together said aqueous solutions so that the resulting slurry contains an end product in an amount of up to 20% by weight;

(iii) aging the resulting slurry containing the reaction product at about 5° to about 100° C. for about 1 to 240 hours;

(iv) washing the resulting precipitate;

(v) subjecting the precipitate to solid-liquid separation;

(vi) drying the wet cake obtained at a temperature of up to about 250° C.;

(vii) optionally heating the dried cake at about 250° to about 950° C.;

(viii) dispersing the resulting powder in water;

(ix) admixing at least one kind of cation with the resulting dispersion;

(x) subjecting the resulting mixture to solid-liquid separation; and (xi) drying the resulting solids.

51. A process as defined in claim 50 wherein the zirconium compound is at least one salt chosen from the group consisting of mineral acid salts, organic acid salts and complex salts.

52. A process as defined in claim 51 wherein the zirconium compound is at least one of zirconium oxychloride, zirconium hydroxychloride, zirconyl sulfate and zirconyl nitrate.

53. A process as defined in claim 50 wherein the phosphorus compound is at least one of phosphoric acid, pyrophosphoric acid, condensation phosphoric acid and alkali metal salts and ammonium salts of these acids.

54. A process as defined in claim 53 wherein the phosphorus compound is phosphoric acid and/or sodium phosphate.

55. A process as defined in claim 50 wherein the silicon compound is at least one of silicic acid, alkali silicates, water glass silicate and colloidal silica.

56. A process as defined in claim 55 wherein the silicon compound is at least one of sodium silicate, sodium metasilicate and water glass silicate.

57. A process as defined in claim 50 wherein the reaction is conducted at a temperature of about 5° to about 70° C.

58. A process as defined in claim 50 wherein the drying is conducted at a temperature of about 40° to about 150° C.

59. A process as defined in claim 50 wherein the cation is at least one ion chosen from the group consisting of $NH_4^+$ and ions formed from metals of Group 1A, Group 1B, Group 2A, Group 2B, Group 3A, Group 3B, Group 5A, Group 6A, Group 7A and Group 8 of the Periodic Table.

* * * * *